United States Patent [19]

Iima

[11] Patent Number: 4,968,876

[45] Date of Patent: Nov. 6, 1990

[54] LASER BEAM READER HAVING A PROJECTING AND RECEIVING OPTICAL SYSTEM

[75] Inventor: Mitsunori Iima, Tokyo, Japan

[73] Assignee: Asahi Kogaku Kogyo Kabushiki Kaisha, Tokyo, Japan

[21] Appl. No.: 266,662

[22] Filed: Nov. 3, 1988

[30] Foreign Application Priority Data

Nov. 4, 1987 [JP] Japan ................................. 62-278943

[51] Int. Cl.$^5$ .............................................. H01J 3/14
[52] U.S. Cl. .................................... 250/216; 250/566
[58] Field of Search ............... 250/216, 235, 550, 572, 250/578, 201 R, 201 AF, 201 DF, 202; 369/44, 45, 46

[56] References Cited

U.S. PATENT DOCUMENTS

| 1014 | 07071987 | Lonsdale/250 |
|---|---|---|
| 1016 | 07211987 | Inoue/250 |
| 4,365,323 | 12/1982 | Heemskerk et al. .................. 369/44 |
| 4,488,042 | 12/1984 | Clay et al. ........................... 250/535 |
| 4,539,482 | 9/1985 | Nose .................................... 250/578 |
| 4,806,774 | 2/1989 | Lin et al. ............................. 250/572 |

*Primary Examiner*—David C. Nelms
*Attorney, Agent, or Firm*—Sandler, Greenblum & Bernstein

[57] ABSTRACT

An optical system of a laser reader has a light projecting portion for emitting a laser beam of light converging toward an object, a condenser lens for condensing a reflecting light from the object and a light receiving element for detecting light quantity of the reflecting light condensed by the condenser lens. The optical axis of the light projecting portion and that of the condenser lens are intersected with each other within readable range which is established by a relation between a spatial frequency of the object and a spot diameter of the laser beam of light.

13 Claims, 3 Drawing Sheets

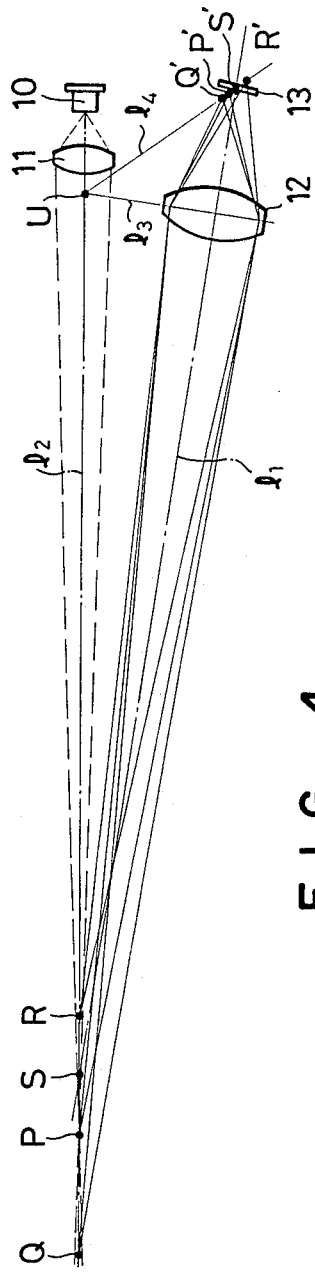
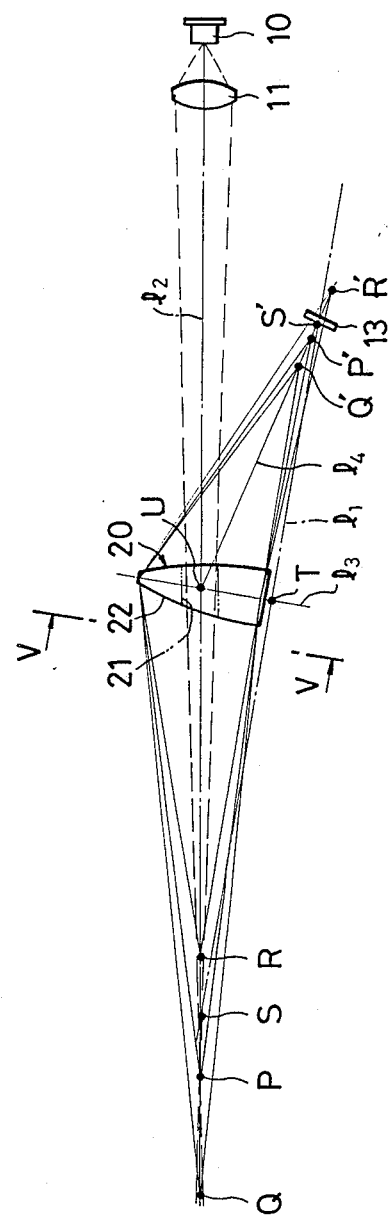
FIG. 3
FIG. 4

LASER BEAM READER HAVING A PROJECTING AND RECEIVING OPTICAL SYSTEM

BACKGROUND OF THE INVENTION

1. Field of the invention

This invention relates to an improvement in an optical system of a laser beam reader for irradiating a laser beam to an object and receiving a beam of light reflected by the object to detect differences in reflectance.

2. Description of the Prior Art

A reader of this type is known, e.g., a pen type bar code reader is known.

The components of an optical system of a conventional pen type bar code reader is schematically shown in FIG. 6. In the figure, reference numeral 1a denotes a casing of a bar code reader. Within the casing 1a, a light emitting diode (LED) 2 acting as a light source and a light receiving element 3 are disposed. Light emitted by the LED 2 illuminates a bar code pattern (not shown) as a reading object through a converging element 4 and is then reflected by the bar code pattern to be made incident into the casing 1a again through the converging element 4. A part of the reflecting light, which has been made incident into the casing 1a, is guided to the light receiving element 3 through an optical fiber 5.

When the bar code pattern is read, the bar code pattern is contacted with the converging element 4 and in that state, the bar code pattern is scanned by the reader. By this, there can be detected information which the bar code pattern has in accordance with the changes in reflectance of the bar code pattern due to the scanning.

However, the above-mentioned bar code reader has an extremely narrow readable range. Therefore, when the converging element 4 and the bar code pattern are separated from each other, it becomes impossible to read the bar code pattern. Therefore, in case a printed surface of the bar code pattern is not smooth, e.g., in a case in which the pattern is printed on a flexible bag or the like, the converging element 4 and the bar code pattern are readily separated during scanning due to unevenness produced on the printed surface. As a result, it becomes impossible to read such bar code pattern.

The present invention has been developed in view of the above-mentioned problems. It is therefore the object of the present invention to provide an optical system for a laser beam reader which is capable of detecting information of a reading object even if the object is separated from it during the reading.

SUMMARY OF THE INVENTION

In order to achieve the above object, the readable range of the bar code reader must be widened. To this end, it is required that an angular aperture of projecting beams of light is made small and an obstacle, such as optical fibers must be removed from the optical path thereof, so that the convergence of the projecting means of light will not deteriorate and so that the reflecting light is effectively converged to a light receiving element.

In view of this point, an optical system of a laser beam reader according to the present invention comprises a light projecting portion for emitting a converging laser beam of light towards an object, a condenser lens for condensing reflecting light from the object, and a light receiving element for detecting the quantity of light of the reflecting light condensed by the condenser lens, wherein an optical axis of the light projecting portion and that of the condenser lens intersect each other within a readable range on the object side.

BRIEF DESCRIPTION OF THE DRAWINGS

FIG. 3 is a schematic diagram showing a modified embodiment of FIG. 2;

FIG. 4 is a schematic diagram showing a second embodiment of the present invention;

DETAILED DESCRIPTION OF THE EMBODIMENTS

The embodiments of the present invention will be described with reference to FIGS. 1 through 5.

Figure 2:
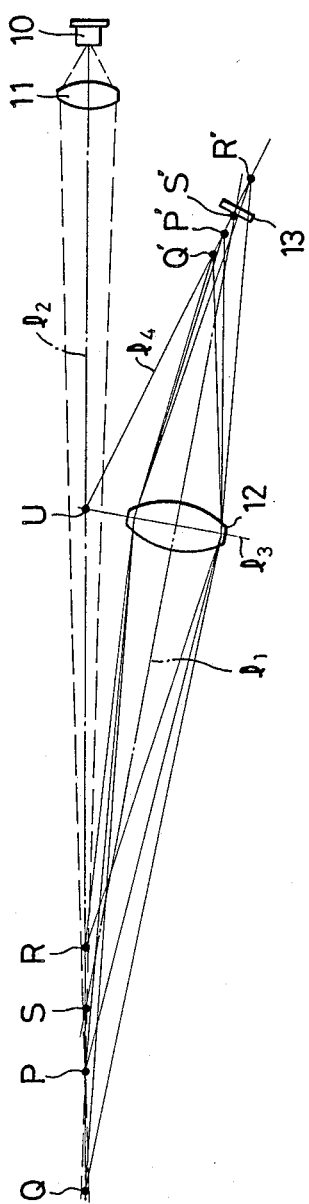
FIG. 2 is a schematic diagram showing a first embodiment of the present invention.

First Embodiment:

FIG. 2 shows a first embodiment of the present invention and FIG. 3 shows a modified embodiment thereof.

The common elements of these two embodiments will be described first herein. In these optical systems, a light projecting portion for projecting a converging laser beam of light leftwardly in the figure toward an object (not shown) comprises a laser diode (hereinafter simply referred to as "LD") 10 and a projecting lens 11. The light projecting portion is set such that a readable beam diameter is provided with respect to the spatial frequency of information which the object has maintained in the section $Q \sim R$ at the front and back of the beam waist P.

A beam of light reflected by the object is condensed toward a light receiving element 13 through a condenser lens 12. At this time, points P, Q and R at the object side are imaged at Q', P' and R', respectively, through the condenser lens 12.

By the way, although the middle point of Q and R is the beam waist P at the reading side, the distance between Q' and P' becomes shorter than that between P' and R' on the image side. Therefore, in order to simultaneously read the information of the object at both ends Q and R of the readable range, the light receiving element 13 is disposed at the middle point S' of the image point range $Q' \sim R'$ corresponding to the readable range.

The condenser lens 12 is disposed as such that an optical axis $l_1$ thereof is intersected with an optical axis $l_2$ of the light projecting portion at a point S (point conjugate with the image point S') within the readable range $Q \sim R$.

A linear line passing through the center of the condenser lens 12 and intersecting with the optical axis $l_1$ at right angles is represented by $l_3$, and a point where linear line $l_3$ is intersected with the optical axis $l_2$ of the light projecting portion is represented by U. A point on the optical axis $l_2$ at the object side is imaged on a linear line $l_4$ which connects the points U and S' according to the Scheimpflug rule.

Due to the above-mentioned arrangement, the condensing efficiency can be most increased when the object is present at the point S. However, the point of intersection of the optical axes $l_1$ and $l_2$ is not limited to the point S, as already mentioned. It contributes to the improvement of the condensing efficiency as long as the point of intersection is present within the reading depth Q~P.

If an optical system of a laser beam reader is constituted in the manner as shown in FIG. 2, the convergency of the projecting beam of light is excellent because no obstacle is present in the optical path of the projecting beam of light, as occurs in conventional readers. Furthermore, since the light receiving element can be disposed in a comparatively close place to the object, the light quantity which can be condensed is comparatively large.

However, if the condenser lens 12 is proximate to the object, the viewing angle from the condenser lens 12 into the section of the point Q~P on the optical axis $l_2$ becomes large. Therefore, the irregularity of the image points Q' and R' also becomes large. As a result, the detecting range which should be covered by the light receiving element 13 becomes large, too. However, the light receiving element which is generally used, for example, in pen type bar code readers, is an element such as a photo-transistor, a photo-diode or the like. It is impossible for these elements to completely cover a large light receiving range such as mentioned previously.

By the way, the readable range ideal for reading a spatial pitch of the object is established by the constitution of the projecting portion. However, the actual reading ability of information of the object within a readable range is established by the ratio between an information signal output by the light receiving element 13 and noise.

Therefore, even if the light receiving element 13 is not able to receive all reflected light coming from the readable range as mentioned, information from an object can be read by properly establishing the output power of the LD 10, the sensitivity of the light receiving element 13, etc.

Next, one example is shown in FIG. 3, in which condenser lens 12 is comparatively spaced apart from the object and the looking angle from the condenser lens 12 into the section of the point Q~R on the optical axis $l_2$ is made small. With the foregoing construction, since the range of irregularity of the image points Q' and R' can be made small by reducing the power of condenser lens 12, the same detecting range of the light receiving element 13, as shown in FIG. 2 can be completely covered.

However, since the energy of a reflecting light is reduced in inverse proportion to the square of a distance, in the event that the distance between the object and the condenser lens is as large as in the present case, the light quantity to be condensed is less than the example of FIG. 2, as long as a condenser lens 12 of the same diameter is used. In this case, reading ability can also be maintained by making the emitting light quantity of the LD 10 large or by making the condenser lens 12 large in diameter.

Figure 1:
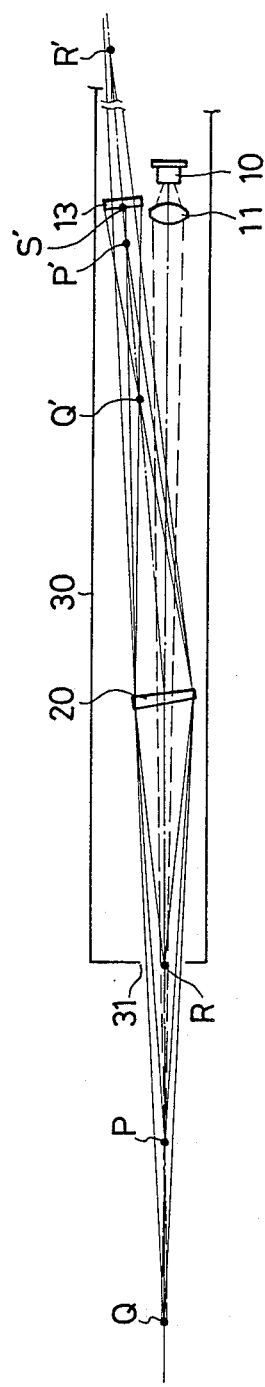
FIG. 1 is a schematic diagram showing an optical system of a laser beam reader according to a third embodiment of the present invention.
Figure 5:
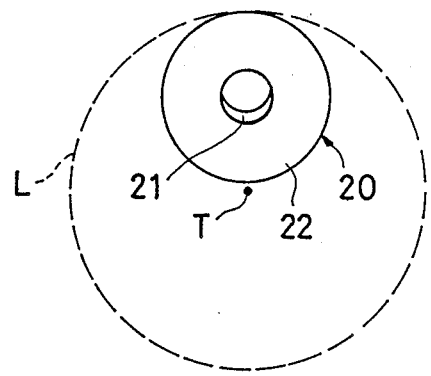
FIG. 5 is a plan view of a light receiving lens of the optical system of FIG. 4 when viewed from the direction of line V—V.
Figure 6:
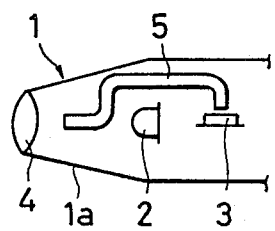
FIG. 6 is a schematic diagram showing an optical system of a conventional pen type bar code reader.

Second embodiment:

FIGS. 1, 4 and 5 show a second embodiment of the present invention.

The principle of an optical system according to this embodiment will be described first with reference to FIG. 4. In the figure, a light projecting portion comprises an LD 10 and a projecting lens 11. The light projecting portion is set as such that a readable beam diameter with respect to a spatial frequency of information which the object has is maintained in the section Q~R at the front and back of the beam waist P.

A condenser lens 20 for guiding reflecting light to a light receiving element 13 is disposed in an optical path of the light projecting portion.

The condenser lens 20 comprises a lens L (spherical lens in this example) of rotary symmetry, with its outer diameter shown by broken lines in FIG. 5, the lens is thus cut such that it has a central axis in a position displaced from its optical axis. Condenser lens 20 is disposed at predetermined angles so that an optical axis $l_1$ of an imaginary lens L and an optical axis $l_2$ of a light projecting portion will be intersected with each other at a point S (refer to the first embodiment of the definition of the point S).

The condenser lens 20 is provided at its central portion with a light transmitting portion 21 for allowing a beam of light emitted by the light projecting portion without changing the progressing direction. The periphery of the light transmitting portion 21 is a deflecting lens portion 22 for deflecting/condensing reflecting light. In this example, the light transmitting portion 21 is an opening.

In FIG. 4, the center of an imaginary lens L is represented by T, a linear line passing through the center T and vertical to an optical axis $l_1$ of the imaginary lens L is represented by $l_3$, and the point of intersection of the linear line $l_3$ and the optical axis $l_2$ of the light projecting portion is represented by U.

Although the light transmitting portion 21 is merely an opening in this example, a plane vertical to the optical axis $l_2$ of the light projecting portion may be formed on each surface of the condenser lens 20. Otherwise, a plane having a different power from the periphery may be formed so that a projecting beam of light will be converged. Likewise, the imaginary lens L, as a matrix of the condenser lens 20, is not limited to a spherical lens having both convex surfaces as shown in this example. Instead, it may be an aspherical lens or a Fresnel lens.

The light receiving element 13 is disposed at an image point S' conjugate with the point S through the condenser lens 20, with its light receiving surface held vertical to a linear line $l_4$.

The function of such an optical system, as mentioned above, will now be described.

A laser beam emitted by the LD 10 becomes a convergent pencil of rays through a projecting lens 11. The pencil of rays is converged as such that it becomes the smallest in beam diameter at the point P after passing through the light transmitting portion 21 of the condenser lens 20. The projecting beam of light is reflected by an object placed between the point Q~R. The reflected light advances along the same optical path as the projecting beam of light until it reaches the condenser lens 20, and is then caused to be moved outwardly from the optical path of the projected light at predetermined angles with respect to the optical axis $l_2$ of the light projecting portion, by a deflecting lens portion 22, and is then condensed towards light receiving element 13.

If the object is present at the point P at this time, the reflecting light is converged to an image point P' on the light receiving element 13 which is conjugate with the point P.

If a linear line passing through points U and P' is represented by $l_4$, a conjugate point of a point on the optical axis l₂ at the object side through the condenser lens 20 is present on the linear line l₄. Therefore, in the event that the object is present at the point Q, the reflected light is converged towards the image point Q', whereas when the object is present at the point R, the reflecting light is converged toward the image point R'.

In this way, according to the Scheimpflug rule, the center lines of the respective reflecting beams of light which are converged to different image points can be moved into alignment with linear line l₄. And, since the linear line l₄ passes through the center of the condenser lens 20, the converging direction is the same even if the position of the image point is different on the optical axis l₂, and even when the condenser lens 20 approaches an object, the area of reflecting light can be covered with a small light receiving element. Therefore, the reflected light can be more effectively guided to the light receiving element than in the aforementioned embodiment.

Furthermore, since the condenser lens 20 can be disposed within the optical path of the projected light, the construction of this portion can be made compact compared with the above-mentioned optical system in which the condenser lens is disposed along a path separate from the optical path of projected light.

Another example in which the present invention is applied to a pen type bar code reader will now be described with reference to FIG. 1. Identical component parts to those of FIG. 4 are denoted by identical reference numerals and description thereof will thus be omitted.

Within a casing 30 of this bar code reader, a light projecting portion comprising an LD 10 and a projecting lens 11, a condenser lens 20 of the same type as that of FIGS. 4 and 5, and a light receiving element 13, are disposed. A laser beam, which is emitted by the LD 10, is converged toward the position P of the beam waist by the projecting lens 11, and a readable beam diameter with respect to a bar code pattern of a certain specification is maintained in the section Q~R at the front and back of the beam waist P.

The casing 30 is provided at its front end portion with an opening 31 for permitting a beam of light to pass therethrough, the opening 31 being coincident with a point R. The opening 31 may be a through-hole, as shown in the figure, or it may be covered up with cover glass.

The function of this optical system is the same as that of FIG. 4 mentioned above. Regarding the bar code pattern of a certain specification, information can be read even when the pattern is separated apart from the opening of the casing 30 as long as it is located somewhere between the points Q~R.

In addition, the readable range becomes wider than the points Q~R when a bar code pattern of a specification of smaller spatial frequency (rough pattern) than the above-mentioned specification is read, whereas the readable range becomes narrower than the points Q~R when a bar code pattern of a specification of larger spatial frequency is read. And, when the readable range becomes narrow, a bar code pattern intimately contacted with the opening 31 becomes impossible to be read. Therefore, when bar code patterns of several kinds of specifications are to be read, the limit point at the near side of the reading depth with respect to a bar code of a specification of the largest spatial frequency is brought to be coincident with the opening 31 and, for example, the point R of FIG. 1 is positioned within the casing 30.

Although an optical system of a laser reader of the present invention is applied to a pen type bar code reader in this embodiment, it can detect an optical information of a material noncontact, so that the same can be used for inspecting a surface of a substance, dust attached to a product or the like.

What is claimed is:

1. An optical system of a laser beam reader comprising:
   a laser means for emitting a laser beam;
   a projecting lens for directly projecting and converging said laser beam from said laser means onto an object having a pattern with a spatial frequency;
   a condenser lens for condensing light reflected from the object; and
   a light receiving means for detecting the quantity of condensed light reflected from the object;
   wherein an optical axis of said projecting lens and an optical axis of said condenser lens intersect with each other within a readable range on the basis of a relationship between the spatial frequency of the object and a spot diameter of a converged laser beam.

2. An optical system of a laser reader according to claim 1, wherein a beam waist of the laser beam of light is positioned at an outer side than an opening of a casing, the opening for permitting the laser beam of light to be emitted outside therethrough.

3. An optical system of a laser reader according to claim 1, wherein said readable range is set as such that the vicinity of the opening of the casing is served as a limit point at a near side.

4. An optical system of a laser reader according to claim 1, wherein said light receiving element is positioned within a range conjugate with said readable range through said condenser lens.

5. An optical system of a laser reader according to claim 4, wherein said light receiving element is disposed in a position able to receive all reflecting light coming from within said readable range.

6. An optical system of a laser reader according to claim 4, wherein said light receiving element is disposed in a position able to receive a part of the reflecting light coming from within said readable range.

7. An optical system of a laser reader according to claim 4, wherein said light receiving element is disposed behind a point conjugate with said beam waist through said condenser lens.

8. An optical system of a laser reader comprising
   a laser means for emitting a laser beam of light;
   a projecting lens for directly projecting and converging said laser beam from said laser means onto an object;
   a condenser lens disposed in an optical path of the beam of light emitted by said laser means and provided at a portion overlapping with said optical path with a transmitting portion for permitting the beam of light to pass therethrough without changing progressing direction thereof, said condenser lens being further provided at the periphery of said transmitting portion with a deflecting lens portion for deflecting the reflecting light from the object and condensing the same; and
   a light receiving element for detecting light quantity of the reflecting light condensed by said condenser lens.

9. An optical system of a laser reader according to claim 8, wherein a point on the optical axis of said light projecting portion at the object side is imaged on the optical axis of said condenser lens.

10. A condenser lens circularly cut by serving a position eccentric from an optical path of a lens of rotary symmetry as a central axis, said condenser lens being provided around the central axis with a transmitting portion for permitting a beam of light to pass therethrough without changing the progressing direction thereof and around said transmitting portion with a deflecting lens portion for deflecting the beam of light and then condensing the same.

11. A condenser lens according to claim 10, wherein said transmitting portion is an opening.

12. An optical system of a bar-code reader comprising:
a laser means for emitting a laser beam;
a projecting lens for directly projecting and converging said laser beam from said laser means onto an object having a pattern with a spatial frequency;
a condenser lens for condensing light reflected from the object; and
a light receiving means for detecting the quantity of condensed light reflected from the object;
wherein an optical axis of said projecting lens and an optical axis of said condenser lens intersect with each other within a readable range on the basis of a relationship between the spatial frequency of the object and a spot diameter of a converged laser beam.

13. An optical system of a laser reader comprising:
a laser means for emitting a laser beam;
a projecting lens for directly projecting and converging said laser beam from said laser means onto an object, said projecting lens having an optical axis;
a condenser lens for condensing light reflected from said object; and
a light receiving means for detecting the quantity of condensed light reflected from the object;
wherein said projecting lens and said light receiving means are arranged in accordance with the Scheimpflug rule in relation to said condenser lens such that said light receiving means is normal to a conjugated line of the optical axis of said projecting lens.

* * * * *